June 2, 1959     C. L. DENSHAM     2,888,800
ENGINE WITH EXHAUST GAS EXTRACTOR
Filed March 29, 1954     2 Sheets-Sheet 1
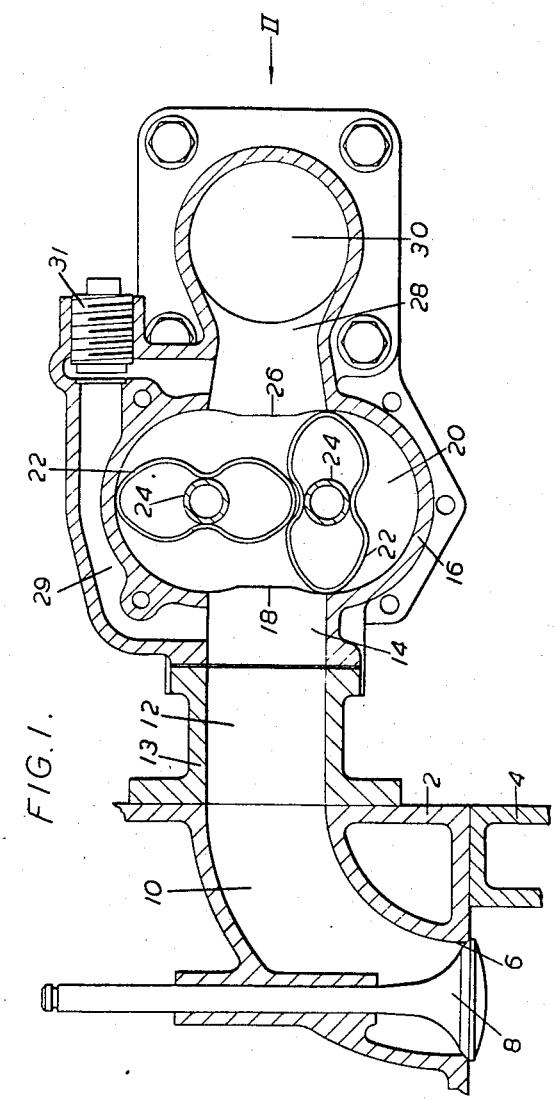
Inventor
Costin Lane Densham

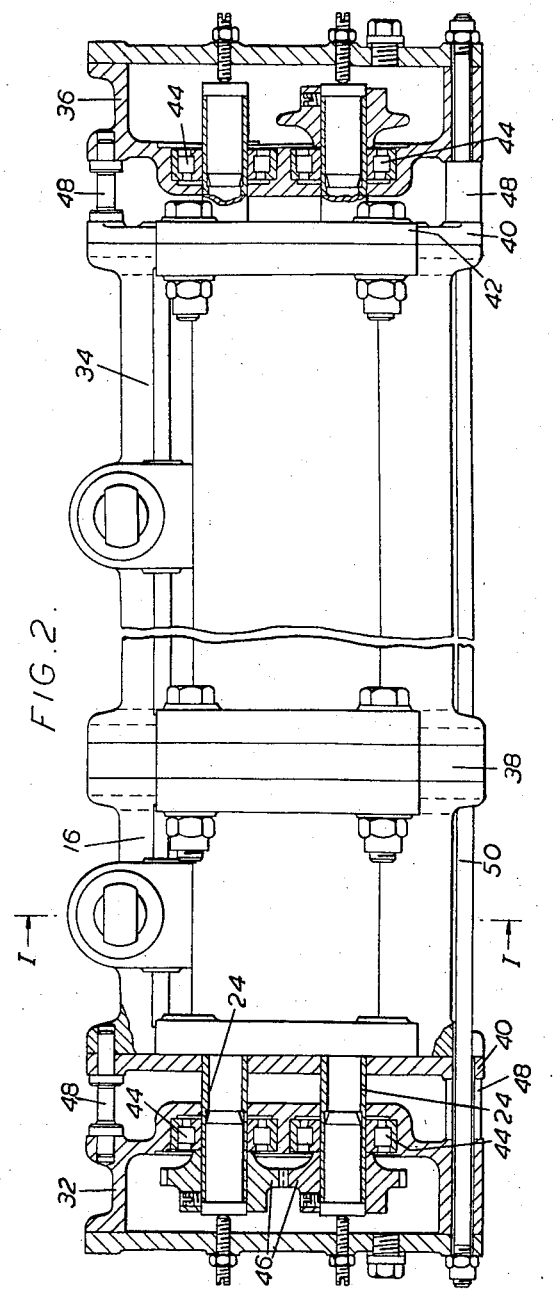

United States Patent Office 2,888,800
Patented June 2, 1959

2,888,800

ENGINE WITH EXHAUST GAS EXTRACTOR

Costin Lane Densham, Chaldon, England, assignor to Wade Engineering Limited

Application March 29, 1954, Serial No. 419,334

Claims priority, application Great Britain March 28, 1951

6 Claims. (Cl. 60—32)

The efficiency of any reciprocating internal combustion engine, i.e. its fuel consumption for giving power output, is affected by the extent to which exhaust gases can be cleared from the cylinder or cylinders at the end of each cycle. In a cylinder of a four-stroke engine a decrease in the pressure at the exhaust port towards the end of the exhaust, i.e. at or about top dead centre, leads to a reduction in the mass of residual exhaust gases and hence to an increase in efficiency. Likewise in a cylinder of a two-stroke engine an increase in efficiency can be brought about by decreasing the pressure at the exhaust port during the latter part of the period during which the exhaust port is open i.e. at or about bottom dead centre.

Now when the exhaust of an engine is led through an exhaust pipe, the pulse of pressure which passes down the pipe just after opening of the exhaust port is in part reflected, either from the open end of the pipe, or from the beginning of a silencer, and returns to the exhaust port, with or without inversion. It is again reflected from the exhaust port and passes up and down the pipe, dying away. Thus the pressure at the exhaust port is determined by superimposed pulses, and the manner in which the pulses are superimposed depends on the length of pipe and on the speed of the engine. At certain speeds the pressure at the exhaust port at the end of the exhaust stroke or period will be low, even sub-atmospheric, and the engine will operate at high efficiency, but at other speeds this pressure may be considerably above atmospheric so that a much larger mass of exhaust gas remains in the cylinder and the engine operates at lower efficiency. In a stationary engine running at constant speed it may be possible to select a length and shape of exhaust pipe which will give high efficiency at that speed, but in engines running at varying speed, especially in vehicles, this is not possible.

The principal object of the present invention is to provide an exhaust system which will enable engines to run at greater efficiency than hitherto over a range of speeds.

In engines according to the present invention the exhaust port of a cylinder is connected by a short passage to a freely running positive displacement extractor, preferably of the Roots type. This extractor picks up energy from the exhaust gases during the early part of each exhaust stroke or period, and gives up energy during the latter part of the exhaust stroke or period, so lowering the pressure at the inlet side of the extractor towards the end of the exhaust stroke or period. The energy picked up by the extractor is derived principally from the initial pulse of pressure of the exhaust gases.

The initial pulse of pressure of the exhaust gases is in part absorbed by the extractor, so imparting energy to it, and is in part reflected. The action of the extractor will not lead to lowering of pressure at the exhaust port at the end of the exhaust stroke or period at all engine speeds unless the reflected pulse is absorbed before the end of the exhaust stroke or period. Accordingly the connecting passage between the exhaust port and the extractor should be as short as possible so that the pulse is reflected from opposite ends of the passage in very rapid succession, thus dying rapidly away and at the same time imparting further energy to the extractor. The use of the extractor and short connecting passage enables a low pressure, which may be sub-atmospheric, to be attained at the end of the exhaust stroke or period at all engine speeds.

For the purposes of the present invention the length of the connecting passage from the exhaust port of the engine to the inlet port of the extractor must never exceed a foot. In practice the presence of a water jacket or air cooling fins round the engine cylinder head will necessitate a length of at least three to five inches.

The extractor must be constructed to withstand the temperature of the exhaust gases. In particular its bearings must be kept cool. If an extractor of Roots type is used, the rotors may be supported by bearings in small housings connected by necks to the main extractor body in which the rotors turn. The body need not be cooled, but the bearings may have jackets connected to an engine-cooling system.

In a multi-cylinder engine an extractor may be provided for each cylinder, the extractors being preferably mechanically interconnected. Alternatively, cylinders which have exhaust periods which do not overlap, or which coincide exactly, may be connected to the same extractor, where this does not involve excessive length of passage.

The invention is applicable to all four-stroke and two-stroke engines, but is particularly applicable to diesel engines in which the incoming charge contains no fuel so that it does not matter if a part of it is drawn into the exhaust system during the "overlap" period when both exhaust and inlet ports are open.

It is essential that the extractor is of a positive displacement type. Free-running turbines, whether radial or axial flow, will not operate satisfactorily over a range of speeds and will not efficiently take up and redeliver energy in the manner required. The Roots type is preferred by reason of simplicity, but other forms of extractor, including those with expansion such as a Lysholm extractor, may be used instead.

It is also essential that the extractor is wholly free running so that it takes no net power from the engine apart from friction losses which are small.

The operation depends to some extent on the inertia of the rotating parts of the extractor. For a given engine the inertia for highest efficiency is best found by experiment. If a flywheel is fitted to the extractor, this may be built up of laminations so that its inertia can be varied until best results are obtained.

Excessive back-pressure may be prevented by providing the extractor with a restricted by-pass which can be adjusted to pass, say, ten percent of the gas.

The invention may be applied in addition to the inlet side of an engine. That is to say the inlet port of a cylinder can be connected by a short passage to a freely running positive displacement blower. The effect of this is to increase the pressure in the cylinder at the end of the inlet stroke, with an accompanying increase in the mass of the charge. There should be no mechanical connection between blowers on the inlet side and extractors on the exhaust side of an engine. The action sought is not that of an orthodox turbo-charger in which energy is transferred from the exhaust side to the inlet side of the engine. This application is a continuation-in-part of my application Serial No. 278,261, filed March 24, 1952, for "Internal Combustion Engines," now abandoned.

The accompanying drawings show an example of the arrangement of an engine according to the invention. In these drawings:

Figure 1 is a cross section, on the line I—I in Figure 2, through part of a cylinder head and an associated extractor; and Figure 2 is an elevation from the direction of the arrow II in Figure 1.

The head 2 of a cylinder 4 contains an exhaust port 6 controlled by a valve 8. The port leads to a passage 10 in the head 2, and this passage is continuous with a passage 12 in an adapter 13, and a passage 14 in a housing 16 of a Roots type extractor. The passage 14 leads to an inlet port 18 of the extractor cavity 20. The total length of passage from the exhaust port 6 to the inlet port 18 is 7¼ inches.

The cavity 20 houses two rotors 22 on shafts 24, and has an outlet port 26 leading via a passage 28 to an exhaust manifold 30, which extends in a direction parallel to the shafts 24.

The extractor housing incorporates a by-pass passage 29, restricted by an adjustable plug 31.

Figure 2 illustrates how a number of extractors serving different cylinders are mechanically interconnected. The shafts 24 extend continuously from a bearing and gear housing 32, through the extractor housing 16, through one or more further extractor housings 34, into a further bearing housing 36. The cavities of adjacent extractors are separated by partitions 38 in which are clearance holes for the shafts 24, and a large hole forming part of the exhaust manifold. The outer ends of the cavities are closed by end plates 40, also with clearance holes for the shafts. One end of the exhaust manifold is blanked off by a plate 42, while the other end is connected to an exhaust pipe, not shown.

The shafts are journalled in roller bearings 44 in the walls of the housings 32 and 36, and are geared together by gear wheels 46 in the housing 32. The housings 32 and 36 are thermally insulated from the extractor housings by ceramic distance pieces 48, and are held in place by tie rods 50.

Figure 2 shows that the extractors may be made of different capacity by making the housings and rotors of different length, although of the same cross section. Such difference of capacity may be required if different numbers of cylinders are associated with different extractors.

It is convenient to use a small number of standard sizes of extractor in conjunction with a wide variety of engines, and the purpose of the adaptor 13 is to connect the passages in the engine and extractors which are not necessarily in alignment with one another.

I claim:

1. In a reciprocating internal combustion engine the combination of an engine cylinder having an exhaust port, a wholly freely running positive displacement extractor having an inlet port, and means defining a gas pulse absorbing passage not more than a foot long connecting said exhaust port and said inlet port.

2. The combination claimed in claim 1 wherein said extractor is of Roots type.

3. The combination claimed in claim 1 wherein said extractor is associated with means defining a restricted by-pass around said extractor.

4. The combination claimed in claim 1 wherein said engine includes means for charging said cylinder with air free of fuel.

5. In a reciprocating internal combustion engine, the combination of a plurality of engine cylinders having each an exhaust port, a plurality of wholly freely running positive displacement extractors having each an inlet port, means mechanically interconnecting said extractors, and means defining gas pulse absorbing passages, each not more than a foot long, connecting said exhaust ports to said inlet ports.

6. The combination claimed in claim 5 wherein the exhaust ports of more than one of said cylinders, being cylinders chosen from those, the exhaust periods of which either do not overlap or coincide exactly, are connected to the inlet port of a single one of said extractors.

References Cited in the file of this patent

UNITED STATES PATENTS

| 745,703 | Westinghouse | Dec. 1, 1903 |
| 949,758 | Duryea | Feb. 22, 1910 |
| 1,043,254 | Russell | Nov. 5, 1912 |
| 1,080,208 | Gardner | Dec. 2, 1913 |
| 1,092,017 | Caron | Mar. 30, 1914 |
| 1,130,419 | Miller | Mar. 2, 1915 |
| 1,815,097 | Davidson | July 21, 1931 |
| 2,198,679 | Radelet et al. | Apr. 30, 1940 |

FOREIGN PATENTS

| 460,221 | France | Sept. 30, 1913 |
| 574,529 | France | Apr. 2, 1924 |
| 307,777 | Germany | Sept. 19, 1919 |
| 403,816 | Germany | Oct. 6, 1924 |
| 309,685 | Great Britain | Apr. 18, 1929 |
| 325,659 | Great Britain | Feb. 27, 1930 |
| 699,923 | Great Britain | Nov. 8, 1953 |
| 156,211 | Switzerland | Oct. 1, 1932 |